(12) United States Patent
Williams, IV

(10) Patent No.: US 8,899,757 B2
(45) Date of Patent: Dec. 2, 2014

(54) PORTABLE VIDEO PRODUCTION SYSTEM

(71) Applicant: Roy H. Williams, IV, Austin, TX (US)

(72) Inventor: Roy H. Williams, IV, Austin, TX (US)

(73) Assignee: Wizards of Ads, SunPop Studios Ltd., Austin, TX (US)

( * ) Notice: Subject to any disclaimer, the term of this patent is extended or adjusted under 35 U.S.C. 154(b) by 35 days.

(21) Appl. No.: 13/761,363

(22) Filed: Feb. 7, 2013

(65) Prior Publication Data

US 2014/0218615 A1    Aug. 7, 2014

(51) Int. Cl.
*H04N 5/28*    (2006.01)

(52) U.S. Cl.
CPC ........................... *H04N 5/28* (2013.01)
USPC ....... 353/28; 353/30; 348/14.07; 348/211.12; 348/722; 352/44

(58) Field of Classification Search
USPC ........ 353/28, 30, 122; 348/333.08, 54, 207.1, 348/333.01, 722, 375, 14.02, 14.1, 20, 61, 348/14.07; 352/44; 359/630; 345/8, 9
See application file for complete search history.

(56) References Cited

U.S. PATENT DOCUMENTS

| | | | | |
|---|---|---|---|---|
| 5,373,333 A * | 12/1994 | Kawada et al. | ............... | 353/122 |
| 5,477,282 A * | 12/1995 | Moore | ............................. | 352/4 |
| 6,280,039 B1 * | 8/2001 | Barber | .......................... | 353/119 |
| 6,717,619 B2 * | 4/2004 | Wasada | ......................... | 348/375 |
| 6,980,253 B1 * | 12/2005 | Matsui | .......................... | 348/375 |
| 7,972,006 B2 * | 7/2011 | Giraldo et al. | ................. | 353/28 |
| 8,350,960 B2 * | 1/2013 | DeOtte | ......................... | 348/375 |
| 2002/0075461 A1 | 6/2002 | Peatross et al. | | |
| 2002/0088009 A1 | 7/2002 | Dukiewicz et al. | | |
| 2003/0112337 A1 | 6/2003 | Sato et al. | | |
| 2003/0153351 A1 | 8/2003 | Jung | | |
| 2004/0189805 A1 | 9/2004 | Seitz | | |
| 2005/0283717 A1 | 12/2005 | Giraldo et al. | | |
| 2006/0242678 A1 | 10/2006 | Kostadinovich | | |
| 2007/0116114 A1 | 5/2007 | Kuppens et al. | | |
| 2007/0206090 A1 | 9/2007 | Barraud et al. | | |
| 2007/0263076 A1 | 11/2007 | Andrews et al. | | |
| 2007/0266090 A1 * | 11/2007 | Len | ............................... | 709/204 |
| 2008/0309889 A1 * | 12/2008 | Rivera | ............................ | 353/98 |
| 2009/0153804 A1 | 6/2009 | Giraldo et al. | | |
| 2009/0195655 A1 | 8/2009 | Pandey | | |
| 2009/0256970 A1 * | 10/2009 | Bilbrey et al. | ................ | 348/722 |
| 2010/0182513 A1 | 7/2010 | DeOtte | | |
| 2010/0293465 A1 | 11/2010 | Kleinschmidt et al. | | |
| 2011/0298935 A1 | 12/2011 | Segal | | |

* cited by examiner

*Primary Examiner* — William C Dowling
(74) *Attorney, Agent, or Firm* — Larson Newman, LLP

(57) ABSTRACT

A portable video production system includes a stand, a prompter portion, a mirror, a piece of glass, and a measuring device. The stand includes a table and a plurality of legs, and is configured to adjust a height of the legs based on a height of a user. The prompter portion includes a plurality of legs and a plurality of supports, and the supports extend between the legs of the prompter portion. The mirror is connected between first and second supports of the plurality of supports, and is configured to reflect a display of a laptop. The piece of glass is connected between third and fourth supports of the plurality of supports, and reflects the reflection of the display from the mirror to provide a reflected image to the user and to enable a video to be filmed through the glass without the reflected image appearing in the video. The measuring component is connected to the table, and extends from the table and being of a first specific length to indicate a first distance for the user to stand from the table.

20 Claims, 5 Drawing Sheets

PORTABLE VIDEO PRODUCTION SYSTEM

FIELD OF THE DISCLOSURE

This disclosure generally relates to a video capture system, and more particularly relates to a portable video production system.

BACKGROUND

Companies can create videos for a variety of uses, such as instructional videos, commercials, informative videos, and the like. The company may need to hire a video production company to produce the video for them. To create the video, the person or persons that may be in the video can then go to the production company's location to shoot the video, the production company can send an entire production crew including equipment and personnel to the company's office, or the like.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
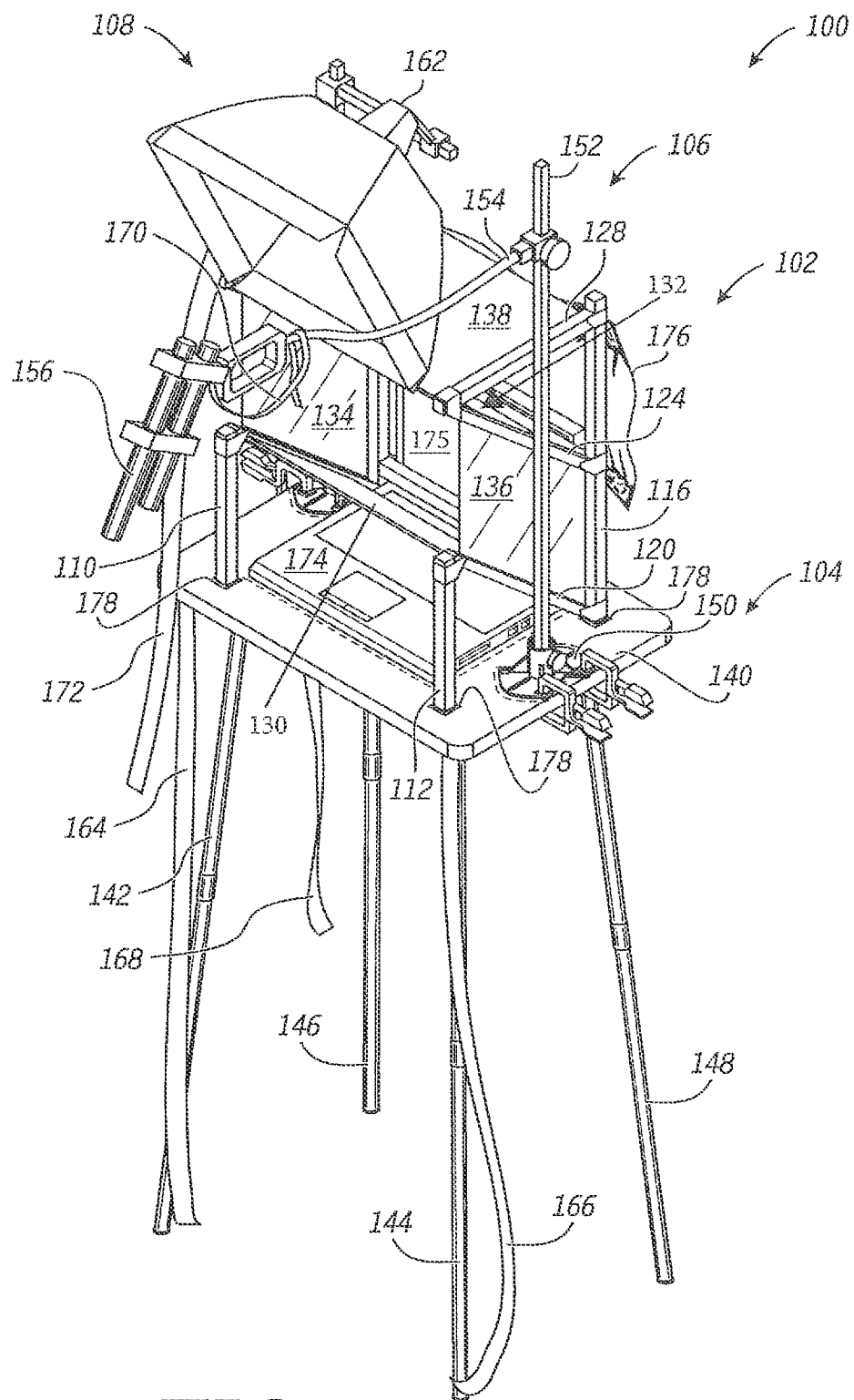
FIGS. 1-3 are different views of a portable video production system in accordance with at least one embodiment of the present disclosure.
Figure 2:
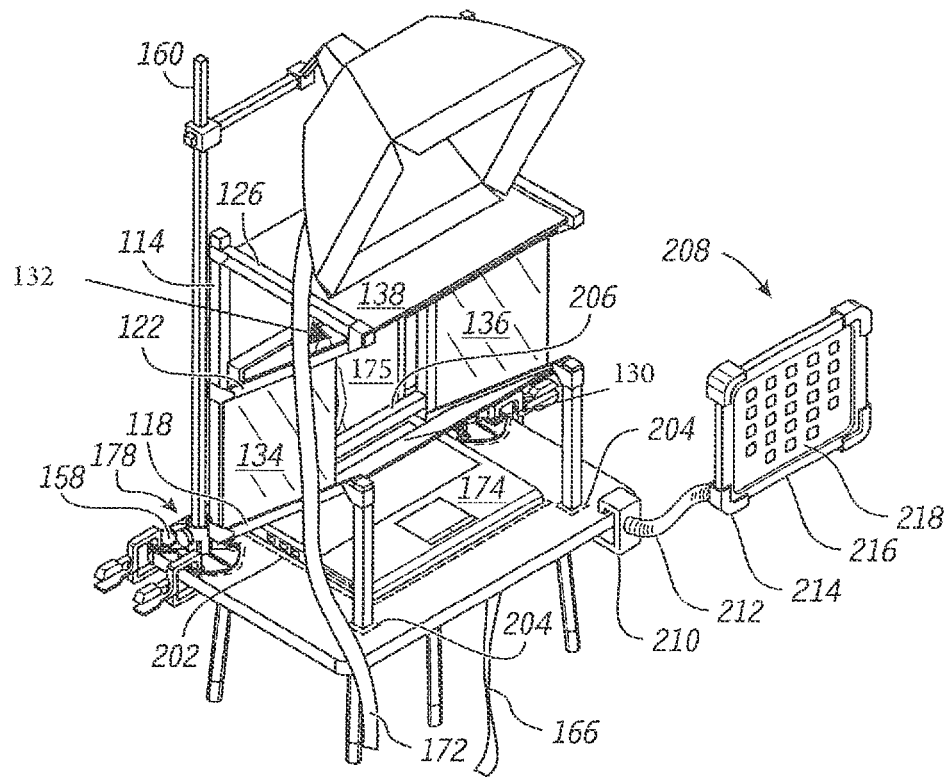
Figure 3:
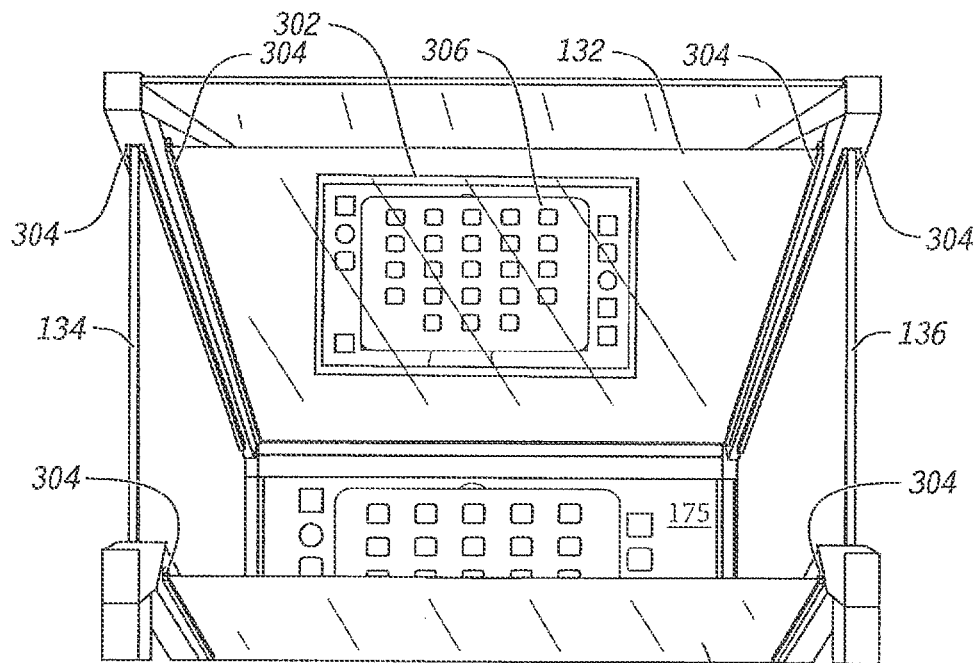

FIGS. 1-3 show a portable video production system 100 in accordance with at least one embodiment of the present disclosure. The portable video production system 100 includes a prompter portion 102, a stand 104, microphone portion 106, and lighting portion 108. The prompter portion 102 includes legs 110, 112, 114, and 116, supports 118, 120, 122, 124, 126, and 128, mirror 130, pieces of glass 132, 134, and 136, and cover 138. The stand 104 includes table 140 and legs 142, 144, 146, and 148. The microphone portion 106 includes a base 150, a leg 152, an arm 154, and a microphone 156. The lighting portion 108 includes a base 158, a leg 160, and light 162. The portable video production system 100 further includes measuring devices 164, 166, 168, 170, and 172 (164-172). The measuring devices 164-172 can be any type of device capable of measuring a specific distance, such as a measuring tape, a ribbon, a length of cloth, or the like.

The legs 110, 112, 114, and 116 of the prompter portion 102 are preferably connected together by the supports 118, 120, 122, 124, 126, and 128. For example, one end of the support 118 connects to a bottom portion of the leg 114, and the support extends upward at an angle so that the opposite end of the support connects to a top portion of the leg 110. Similarly, one end of the support 120 connects to a bottom portion of the leg 116, and the support extends upward at an angle so that the opposite end of the support connects to a top portion of the leg 112. The support 126 preferably extends away from the top portion of the leg 114 toward the front of the prompter portion 102. In an embodiment, the support 126 can extend from the leg 114 at a ninety degree angle. The support 122 extends from a location of the leg 114 that is between the bottom and the top of the leg, extends upward and toward the front of the prompter portion 102, and connects with an opposite end of the support 126 than leg 114. The support 128 preferably extends away from the top portion of the leg 116 toward the front of the prompter portion 102. In an embodiment, the support 128 can extend from the leg 116 at a ninety degree angle. The support 124 extends from a location of the leg 116 that is between the bottom and the top of the leg, extends upward and toward the front of the prompter portion 102, and connects with an opposite end of the support 128 than leg 116.

The mirror 130 of the prompter portion 102 can be positioned between the supports 118 and 120, and is preferably angled to provide a reflection of the display of the laptop 174 (from a display screen 175 of the laptop) onto the piece of glass 132, which can be positioned between the supports 122 and 124. The reflection of the display from the mirror 130 can be reflected off the piece of glass 132 and provided as reflected image 302 to a user as shown in FIG. 3. The piece of glass 132 can be a piece of teleprompter glass or the like that can provide the reflected image 302 to the user and at the same time can enable a video of a user to be recorded through the piece of glass without the reflected image appearing in the video. The reflected image 302 can be displayed in an upright position with the same orientation as the display of the laptop 174.

The piece of glass 134 can be connected between the supports 118 and 122 and can be any type of opaque material. Similarly, the piece of glass 136 can be connected between the supports 120 and 124 and can be any type of opaque material. In an embodiment, the supports 118, 120, 122, and 124 can each include channels 304 (shown in FIG. 3) that the mirror 130 and pieces of glass 132, 134, and 136 can slide between so that the mirror and pieces of glass can be held in a proper location. For example, channels 304 on inner portion of supports 118 and 120 can hold the mirror 130 in place between these supports. The channels 304 on inner portions of supports 122 and 124 can hold the glass 132 in place to provide the reflected image 302 to the user. A channel 304 on the bottom portion of support 122 and a channel on a top portion of support 118 can hold the glass 134 in place. Similarly, the channel 304 on the bottom portion of support 124 and the channel 304 on the top portion of the support 112 can hold the glass 136 in place.

The channels 304 can provide easy access to the mirror 130 and pieces of glass 132, 134, and 136 so that the user can easily remove the mirror and pieces of glass from the prompter portion 102. The user can remove the mirror 130 and pieces of glass 132, 134, and 136 to clean the mirror and pieces of glass, to move the portable video production system 100, or the like.

The cover 138 can be connected between the supports 126 and 128, and can be any type of opaque material, such as tinted glass, cloth, or the like. In an embodiment, the cover 138 can also be connected to the prompter portion 102 is such a way that the user can easily remove the cover. The pieces of glass 134 and 136, and the cover 138 can reduce an amount of light on the mirror 130 and the glass 134 so that the user can view the reflected image 302 of the display of the laptop 174 easier than if the glass 134 and 136 and the cover 138 where not connected within the prompter 102.

In an embodiment, the prompter 102 can also include a flap 176. The flap 176 can connect to the top of the back portions of the legs 114 and 116, and can be a piece of cloth that can be lifted to provide room for a camera to connect to the back of the prompter 102. The pieces of glass 134 and 136, the cover 138, and the flap 176 can provide a lighting condition within the prompter 102 that enables the reflection of the laptop 174 to be viewed by the user while the camera can film the user through the piece of glass 132. In an embodiment, the prompter portion 104 can also include piece of glass located within the triangle created by leg 114, support 122, and support 126. In this embodiment, the piece of glass can be substantially similar to the piece of glass 134. In an embodiment, the prompter portion 104 can also include piece of glass located within the triangle created by leg 116, support 124, and support 128. In this embodiment, the piece of glass can be substantially similar to the piece of glass 136.

Each of the legs 142-148 of the stand 104 can extend from a different corner of the table 140. In an embodiment, the legs 142-148 can be telescopic legs so that the length of the legs can be adjusted based on the height of the user of the portable video production system 100. Also, the user can collapse the legs 142-148 to a shortest length, then fold the legs under the table 140, and then snap the entire portion of each of the legs under the table to make moving the stand 104 easier for the user. When the user gets the stand 104 to a desired location, the user can unfold each of the legs 142-148 and can extend the legs to a desired height.

The laptop 174 can be placed in a specific location on the table 140 by placing the laptop within an outlined area 202 as shown in FIG. 2. The prompter portion 102 can be positioned on the table 140 of the stand 104 by placing the legs 110-116 of the prompter within the outlined areas 204 as shown in FIG. 2. The outlined areas 202 and 204 can be lined with solid lines, dashed lines, or the like. In an embodiment, a base of the laptop 174 can be located in between a bottom portion of the mirror 130 of the prompter and a top surface of the table, between a bottom portion of a support 206 and the top surface of the table, and a display of the laptop can extend upward behind the prompter portion. The support 206 can extend from an inner portion of leg 114 and an inner portion of leg 116.

In an embodiment, the support 206 can be located as specific distance up on the legs 114 and 116 to allow the laptop 174 to fit between the support and the table 140. In an embodiment, each of the legs 110-116 can have a pad 178 connected to a bottom of the leg as shown in FIGS. 1 and 2. The pads 178 can be connected to the bottom of the legs 110-116 via a bolt or other adjustable connecting device, such that a distance between the pad and the bottom of the leg can be adjusted to change the height of the prompter portion 102. For example, if a thickness of the laptop 174 is thicker than a previous laptop, the user can adjust the distance between each of the pads 178 and the respective leg 110-116 by unscrewing each of the pads from the respective leg. The increase in distance can increase the distance between the bottom portion of the mirror 130 of the prompter 104 and the top surface of the table, between the bottom portion of the support 206 and the top surface of the table so that a thicker laptop 174 can fit between the prompter portion and the table 140.

The measuring device 164 can be connected to a front left corner of the table 140 of the stand 104. The measuring device 166 can be connected to a front right corner of the base 140 of the stand 104. The measuring device 168 can be connected to a front center portion of the table 140 of the stand 104. In an embodiment, the measuring devices 164-172 can be connected to the portable video production system 100 in a non-permanent manner so that if one of the measuring devices is pulled on with a lot of force the measuring device will break away from the portable video production system without pulling any part or all of the portable video production system over. In another embodiment, the measuring devices 164-172 can be securely and permanently attached to the table 140. The measuring devices 164-172 will be discussed in greater detail with respect to FIG. 8 below.

The portable video production system 100 also includes a tablet holder assembly 208, which in turn includes a clamp 210, an arm 212, and a holder 214. The holder 214 can securely mount a tablet 216 within the tablet holder assembly. In an embodiment, the arm 212 can be flexible so that the user of the portable video production system 100 can move/position the holder 214 and tablet 216 to a desired location. For example, a user may want to position the tablet 216 so that the user can easily read information displayed on the screen 218 of the tablet 216 while the user is still at the location set by measuring devices 164-172. The clamp 210 may be easily attached and removed from the table 140 so that the tablet holder assembly 208 can be connected to the portable video production system 100 only when the tablet 216 will be used during the filming.

The user can wirelessly connect the tablet 216 with the laptop 174 via any short range wireless protocol, such as Bluetooth or the like. The laptop 174 can then display the image of the screen 218, which can then be reflect off the mirror 130 and glass 132 as image 306 in the reflected image 302. The user can also utilize the image 306 to read and/or otherwise view information from the tablet 216 while looking directly at the camera. The laptop 174 can also store the images from the tablet 216 for later use, which will be described in more detail with respect to FIG. 8 below.

Figure 4:
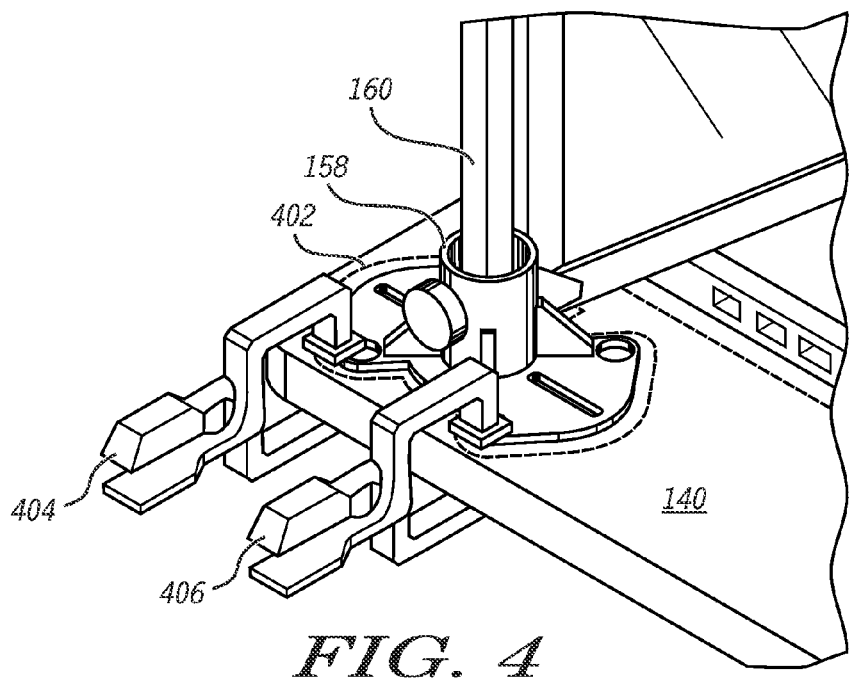
FIGS. 4 and 5 are different views of a lighting portion of the portable video production system in accordance with at least one embodiment of the present disclosure.
Figure 5:
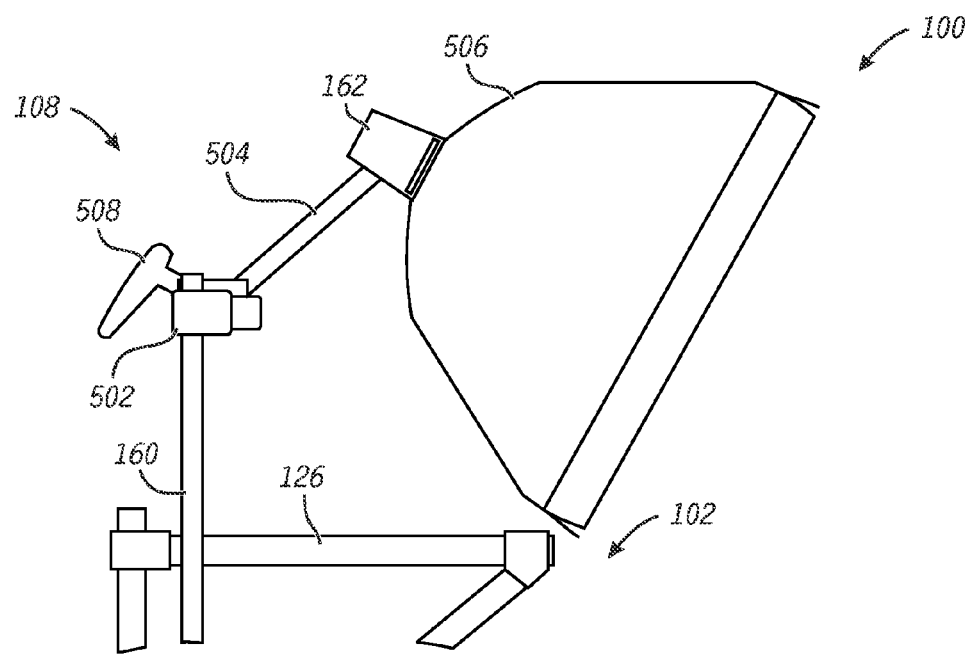

FIGS. 4 and 5 show the lighting portion 108 of the portable video production system 100 in accordance with at least one embodiment of the present disclosure. Referring to FIG. 4, an outlined area 402 on the table 140 can provide the user of the portable video production system 100 with a location to place the base 158 of the lighting portion 108. The user can hold the base 158 of the lighting portion 108 within the outlined area 402 and then secure the base to the table 140 via connecting clamps 404 and 406. In an embodiment, the base 158 can be more securely connected to the table 140, than by the connecting clamps 404 and 406, by the user utilizing bolts or any similar hardware component to hold the base in position with the outlined area 402.

Now referring to FIG. 5, the lighting portion 108 includes a clamp 502, an arm 504, a hood 506, a handle 508, the leg 160, and the light 162. The leg 160 of the lighting portion 108 extends from the base 158 above the support 126 to provide a desired height for the light 162 in relation to the portable video production system 100. The arm 504 is connected to the clamp 502, and can extend upward from the leg 160. In an embodiment, the light 162 is connected along with the hood 506 to the arm 504 in a fixed orientation so that the light and hood can be aligned to provide a direction of the light to the user during the filming of a video. The clamp 502 can connect to various locations along the leg 160 and can be locked in place by the user tightening the handle 508. The height of the light 162 and the hood 506 can be adjusted up and down by moving the location of the clamp 502 along the leg 160. A desired height of the light 162 and the hood 506 can be determined based on a height of the user as described below with respect to FIG. 8.

Figure 6:
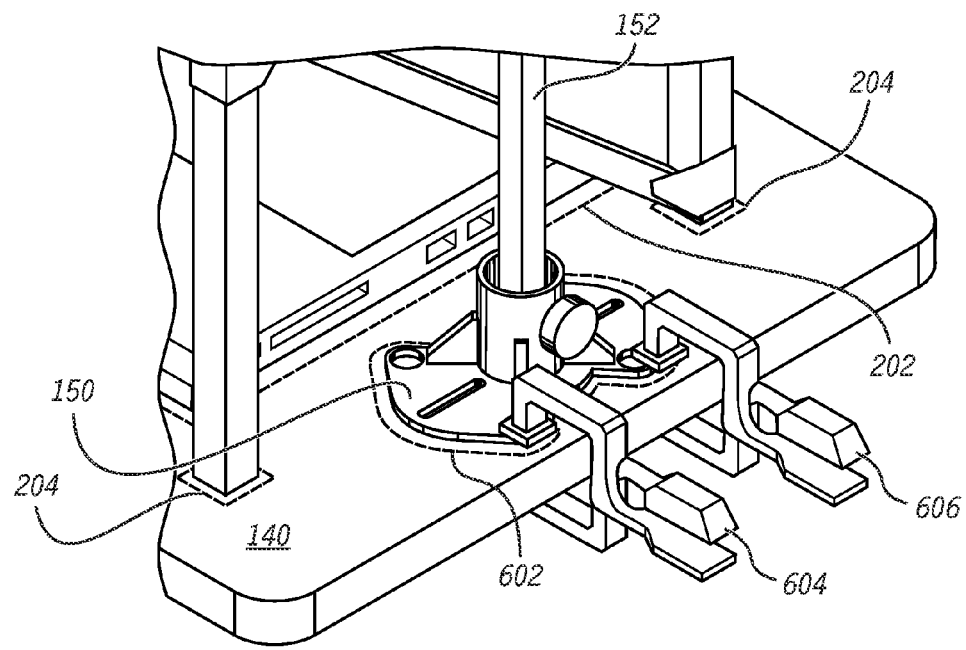
FIGS. 6 and 7 are different views of a microphone portion of the portable video production system in accordance with at least one embodiment of the present disclosure.
Figure 7:
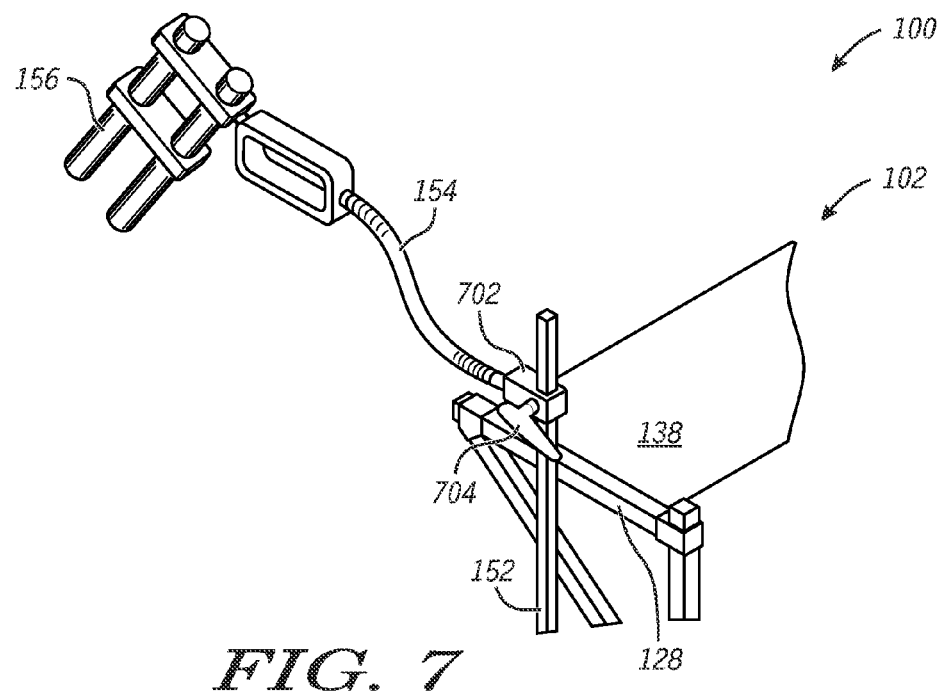

FIGS. 6 and 7 show the microphone portion 106 of the portable video production system 100 in accordance with at least one embodiment of the present disclosure. Referring now to FIG. 6, an outlined portion 602 on the table 140 can provide the user of the portable video production system 100 with a location to place the base 150 of the microphone portion 106. The user can hold the base 150 of the microphone portion 106 within the outline 602 and then secure the base to the table 140 via connecting clamps 604 and 606. In an embodiment, the base 150 can be more securely connected to the table 140, than by the connecting clamps 604 and 606, by the user utilizing bolts or any similar hardware component to hold the base in position with the outlined area 602.

Referring now to FIG. 7, the microphone portion 106 includes a clamp 502, a handle 504, the leg 152, the arm 154, and the microphone 156. The leg 152 of the microphone portion 106 extends from the base 150 above the support 128 and cover 138 to provide a desired height for the microphone 156 in relation to the portable video production system 100. The arm 154 is connected to the clamp 502 and can extend away from the leg 152. The microphone 156 is connected to the arm 154 and the microphone can be positioned to provide a desired angle and distance from the user. The arm 154 can be a flexible arm that can be moved different directions to make the microphone 156 point substantially at the user's mouth. The clamp 502 can connect to various locations along the leg 152 and can be locked in place by the user tightening the handle 504. The height and angle of the microphone 162 can be adjusted up and down by a combination of moving the location of the clamp 502 along the leg 152 and moving the arm 154. A desired height of the microphone can be determined based on a height of the user as described below with respect to FIG. 8.

Figure 8:
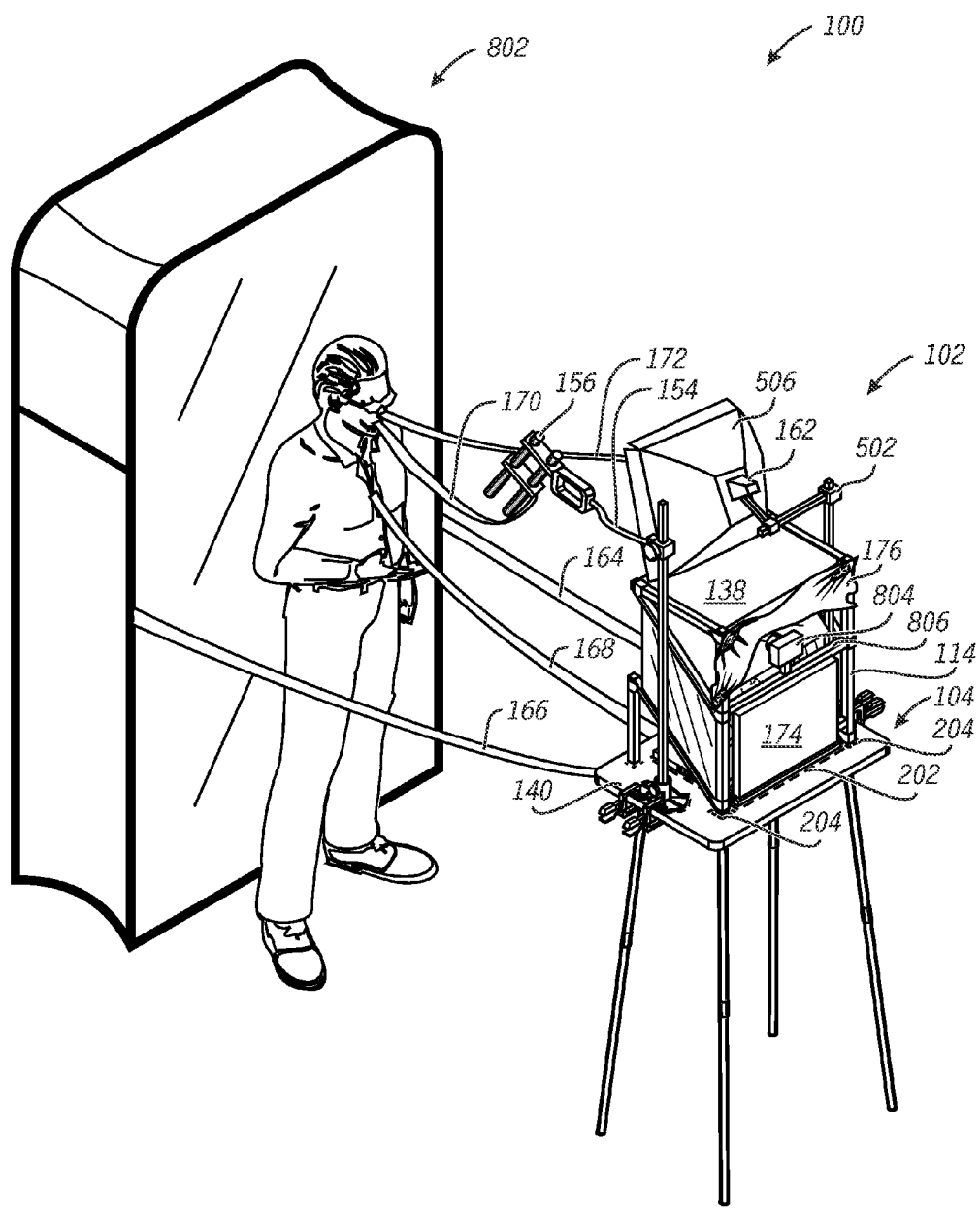
FIG. 8 is perspective view of the portable video production system and a backdrop in accordance with at least one embodiment of the present disclosure.

FIG. 8 is a perspective view of the portable video production system 100 and a backdrop 802 in accordance with at least one embodiment of the present disclosure. When setting up the portable video production system 100, the user can first set up the stand 104 and can verify that the stand 104 is a proper distance from the backdrop 802. The user can check the distance of the stand 104 from the backdrop 802 by extending the measuring device 164 from the front left corner of the table 140 to a corresponding edge of the backdrop. The user can determine that the left side of the stand is the proper distance from the backdrop when the end of the measuring device 164 opposite of the table touches the edge of the backdrop when the measuring device is fully extended. Similarly, the user can check the distance of the stand 104 from the backdrop 802 by extending the measuring device 166 from the front right corner of the table 140 to a corresponding edge of the backdrop. The user can determine that the right side of the stand is the proper distance from the backdrop when the end of the measuring device 166 opposite of the table touches the edge of the backdrop when the measuring device is fully extended.

After the stand 104 is place the proper distance from the backdrop 802, the user can place the prompter portion 102 in the location on the table 140 as indicated by the outlines 204.

The user can then slide the laptop 174 under the mirror 130 (shown in FIGS. 1-3) and can align the laptop within the outline 202 on the table 140. After the prompter portion 102 and the laptop 174 are set up on the table 140 of the stand 104, the user can adjust the legs 142-148 to a desired height so that the reflected image 302 (shown in FIG. 3) is eye level with the user. The user can then determine the proper distance to stand from the prompter portion 102 and the stand 104 by extended the measuring device 168 from the center of the table 140 to the user's body. The user is standing the proper distance from the table 140 when the measuring device 166 only touches the user's body after being fully extended.

The user can then adjust the height of the microphone 156 by moving the clamp 502 up the leg 152 of the microphone portion 106 until the microphone is above the reflected image 302. The user can then measure the distance from the microphone 156 to the user by extending the measuring device 170 from the microphone to the user's mouth. The microphone 156 is the proper distance from the user when the measuring device 170 only touches the user's mouth after being fully extended. The user can further adjust the clamp 702 on the leg 152 until the user determines that the microphone 156 is the proper distance from the user based on the measuring device 170. The user can then move the arm 154 until the microphone is pointing substantially at the user's mouth.

The user can then adjust the height of the light 162 and hood 506 by moving the clamp 502 up the leg 152 of the microphone portion 106 until the hood is above the reflected image 302. The user can then measure the distance from the light 162 to the user by extending the measuring device 172 from the hood 506 to the user's chest. The light 162 is the proper distance from the user when the measuring device 172 only touches the user's chest after being fully extended. The user can further adjust the clamp 502 on the leg 152 until the user determines that the light 162 and the hood 506 are the proper distance from the user based on the measuring device 172.

The user can begin recording a video production after the user has finished setting up the stand 104 and the prompter portion 102 the proper distance from the background 802, has determined the proper distance for the user to stand from the table 140, has set the proper height of the microphone 156, and has set the proper height of the light 162. A camera 804 for the video production can be mounted on a support 806 located above the monitor of the laptop 174 and between the legs 114 and 116 of the prompter portion 102. The flap 176 can cover the camera 804 so that no unnecessary light can get to the camera. Also, the microphone 156 can be plugged into an audio input of the camera 804 to provide high quality audio to the camera. After the video production has been recorded the user can send the video and audio to a remote server to be accessed and edited into a final video production.

The images on the screen 218 of the tablet 216 can also be transmitted along with the recorded video and audio to the remote server for use in editing together the final video production. In particular, during the editing process the images on the screen 218 can be placed within the video from the camera 804. For example, during the editing process the images from the screen 218 can be place above one of the shoulders of the user. In this situation, the user can have slides, pictures, or the like output of the screen 218 of the tablet 216 and in image 306 (shown in FIG. 3 above) to spark the user's memory during filming. Then the final video can include the same pictures, slides, or the like over a shoulder of the user so that a viewer can have a visual aid to further establish what the user is talking about.

The camera 804 can include a wireless communication capability, such that the video and audio can be sent to the remote server without the user having to physically connect the camera to the Internet. The wireless capability of the camera 804 can provide different options for transferring the video and audio to the remote server, such as file transfer protocol, and the like. Thus, the user can utilize the portable video production system 100 to create a high quality video production at any location without having a film crew coming out to the location.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The numerous innovative teachings of the present application will be described with particular reference to the exemplary embodiments. However, it should be understood that this class of embodiments provides only a few examples of the many advantageous uses of the innovative teachings herein. In general, statements made in the specification of the present application do not necessarily limit any of the various claimed inventions. To the contrary, the description of the exemplary embodiments are intended to cover alternative, modifications, and equivalents as may be included within the spirit and scope of the invention as defined by the claims. Moreover, some statements may apply to some inventive features but not to others.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A portable video production system comprising:
   a stand including a table and a plurality of legs, the stand configured to adjust a height of the legs based on a height of a user;
   a prompter portion configured to be placed in physical communication with the table of the stand, the prompter portion including a plurality of legs and a plurality of supports, the supports extending between the legs of the prompter portion;
   a mirror connected between first and second supports of the plurality of supports, the first and second supports each extend from a bottom portion of a respective pair of back legs to a top portion of a respective pair of front legs of the plurality of legs, the mirror configured to reflect a display of a laptop;
   a first piece of glass connected between third and fourth supports of the plurality of supports, the third and fourth supports each extend from a middle portion of the respective pair of back legs, the first piece of glass to reflect the reflection of the display from the mirror to provide a reflected image to the user and to enable a video to be filmed through the glass without the reflected image appearing in the video; and
   a first measuring component connected to the table, the first measuring component to extend from the table and being of a first specific length to indicate a first distance for the user to stand from the table.

2. The portable video production system of claim 1 further comprising:
   a microphone portion including a base, a leg, an arm extending from a top portion of the leg, and a microphone connected to an end of the arm opposite of the leg; and
   a second measuring component connected to the microphone, the second measuring component to extend from the microphone and being of a second specific length to indicate a second distance for the user to stand from the microphone.

3. The portable video production system of claim 2 wherein the table includes an outline of a shape of the base of the microphone portion, wherein the outline is positioned at a location on the table to provide a desired location for the microphone portion.

4. The portable video production system of claim 1 further comprising:
   a lighting portion including a base, a leg, a mount connected a top portion of the leg, and a light connected to an end of the mount opposite of the leg; and
   a second measuring component connected to the light, the second measuring component to extend from the light and being of a second specific length to indicate a second distance for the user to stand from the light.

5. The portable video production system of claim 4 wherein the table includes an outline of a shape of the base of the lighting portion, wherein the outline is positioned at a location on the table to provide a desired location for the lighting portion.

6. The portable video production system of claim 1 further comprising:
   a second measuring component connected to a first front corner of the table, the second measuring component to extend from the first front corner and being of a second specific length to indicate a fourth distance for a backdrop to be placed from the stand.

7. The portable video production system of claim 1 further comprising:
   a cover connected between fifth and sixth supports of the plurality of supports, the fifth and sixth supports each extend from a top portion of the respective pair of back legs, the cover to shade the first piece of glass of the prompter portion.

8. The portable video production system of claim 1 further comprising:
   a flap connected between top portions of the back legs, the flap to cover a back portion of the prompter portion.

9. The portable video production system of claim 1 further comprising:
   an outlined portion of a shape of the plurality of legs of the prompter portion, wherein the outlined portion is positioned at a location on the able to provide a desired location for the prompter portion.

10. The portable video production system of claim 1 further comprising:

an outlined portion of a shape of the laptop, wherein the outlined portion is positioned at a location on the able to provide a desired location for the laptop.

11. A portable video production system comprising:
a stand including a table and a plurality of legs, the stand configured to adjust a height of the legs based on a height of a user;
a prompter portion configured to be placed in physical communication with the table of the stand, the prompter portion including a plurality of legs and a plurality of supports, the supports extending between the legs of the prompter portion;
a mirror connected between first and second supports of the plurality of supports, the first and second supports each extend from a bottom portion of a respective pair of back legs to a top portion of a respective pair of front legs of the plurality of legs, the mirror configured to reflect a display of a laptop;
a first piece of glass connected between third and fourth supports of the plurality of supports, the third and fourth supports each extend from a middle portion of the respective pair of back legs, the first piece of glass to reflect the reflection of the display from the mirror to provide a reflected image to the user and to enable a video to be filmed through the glass without the reflected image appearing in the video;
a first measuring component connected to the table, the first measuring component to extend from the table and being of a first specific length to indicate a first distance for the user to stand from the table;
a microphone portion including a base, a leg, an arm extending from a top portion of the leg of the microphone portion, and a microphone connected to an end of the arm opposite of the leg of the microphone portion;
a second measuring component connected to the microphone, the second measuring component to extend from the microphone and being of a second specific length to indicate a second distance for the user to stand from the microphone; and
a third measuring component connected to a first front corner of the table, the third measuring component to extend from the first front corner and being of a third specific length to indicate a third distance for a backdrop to be placed from the stand.

12. The portable video production system of claim 11 wherein the table includes an outline of a shape of the base of the microphone portion, wherein the outline is positioned at a location on the table to provide a desired location for the microphone portion.

13. The portable video production system of claim 11 further comprising:
a lighting portion including a base, a leg, a mount connected a top portion of the leg, and a light connected to an end of the mount opposite of the leg; and
a fourth measuring component connected to the light, the fourth measuring component to extend from the light and being of a fourth specific length to indicate a fourth distance for the user to stand from the light.

14. The portable video production system of claim 13 wherein the table includes an outline of a shape of the base of the lighting portion, wherein the outline is positioned at a location on the table to provide a desired location for the lighting portion.

15. The portable video production system of claim 11 further comprising:
a flap connected between top portions of the back legs, the flap to cover a back portion of the prompter portion.

16. A portable video production system comprising:
a stand including a table and a plurality of legs, the stand configured to adjust a height of the legs based on a height of a user;
a prompter portion configured to be placed in physical communication with the table of the stand, the prompter portion including a plurality of legs and a plurality of supports, the supports extending between the legs of the prompter portion;
a mirror connected between first and second supports of the plurality of supports, the first and second supports each extend from a bottom portion of a respective pair of back legs to a top portion of a respective pair of front legs of the plurality of legs, the mirror configured to reflect a display of a laptop;
a first piece of glass connected between third and fourth supports of the plurality of supports, the third and fourth supports each extend from a middle portion of the respective pair of back legs, the first piece of glass to reflect the reflection of the display from the mirror to provide a reflected image to the user and to enable a video to be filmed through the glass without the reflected image appearing in the video;
a first measuring component connected to the table, the first measuring component to extend from the table and being of a first specific length to indicate a first distance for the user to stand from the table;
a microphone portion including a base, a leg, an arm extending from a top portion of the leg of the microphone portion, and a microphone connected to an end of the arm opposite of the leg of the microphone portion;
a second measuring component connected to the microphone, the second measuring component to extend from the microphone and being of a second specific length to indicate a second distance for the user to stand from the microphone;
a third measuring component connected to a first front corner of the table, the third measuring component to extend from the first front corner and being of a third specific length to indicate a third distance for a backdrop to be placed from the stand; and
a cover connected between fifth and sixth supports of the plurality of supports, the fifth and sixth supports each extend from a top portion of the respective pair of back legs, the cover to shade the first piece of glass of the prompter portion.

17. The portable video production system of claim 16 wherein the table includes an outline of a shape of the base of the microphone portion, wherein the outline is positioned at a location on the table to provide a desired location for the microphone portion.

18. The portable video production system of claim 16 further comprising:
a lighting portion including a base, a leg, a mount connected a top portion of the leg, and a light connected to an end of the mount opposite of the leg; and
a fourth measuring component connected to the light, the fourth measuring component to extend from the light and being of a fourth specific length to indicate a fourth distance for the user to stand from the light.

19. The portable video production system of claim 18 wherein the table includes an outline of a shape of the base of the lighting portion, wherein the outline is positioned at a location on the table to provide a desired location for the lighting portion.

20. The portable video production system of claim 16 further comprising:

a flap connected between top portions of the back legs, the flap to cover a back portion of the prompter portion.

* * * * *